United States Patent [19]
Naito et al.

[11] 3,904,597

[45] Sept. 9, 1975

[54] ANTIBIOTIC DERIVATIVES

[75] Inventors: Takayuki Naito; Susumu Nakagawa; Yoshio Abe, all of Tokyo, Japan

[73] Assignee: Bristol-Myers Company, New York, N.Y.

[22] Filed: Feb. 23, 1973

[21] Appl. No.: 335,211

[52] U.S. Cl. .............................. 260/210 K; 424/180
[51] Int. Cl.² ......................................... C07G 11/00
[58] Field of Search ....... 260/210 AB, 210 K, 210 R

[56] References Cited
UNITED STATES PATENTS

| | | |
|---|---|---|
| 3,032,547 | 5/1962 | Rothrock et al. ............... 260/210 K |
| 3,541,078 | 11/1970 | Woo et al. ...................... 260/210 R |
| 3,753,973 | 8/1973 | Umezawa ....................... 260/210 K |
| 3,781,268 | 12/1973 | Kawaguchi et al. .......... 260/210 AB |

Primary Examiner—Johnnie R. Brown
Assistant Examiner—Cary B. Owens
Attorney, Agent, or Firm—Robert E. Havranek

[57] ABSTRACT

Derivatives of kanamycin A and B have been prepared which possess substantially improved antibacterial activity. An example of such an agent is 1-[L-(-)-β-amino-α-hydroxypropionyl]-kanamycin B [IVa, BB-K122].

7 Claims, No Drawings

ANTIBIOTIC DERIVATIVES

BACKGROUND OF THE INVENTION

1. Field of the Invention:

This invention relates to a semisynthetic 1-substituted derivatives of kanamycin A or B, said compounds being prepared by acylating the 1-amino-function of kanamycin A or B with a β-amino-α-hydroxypropionyl moiety.

2. Description of the Prior Art:

The kanamycins are known antibiotics described in Merck Index, 8th Edition, pp. 597–598. Kanamycin A is a compound having the formula

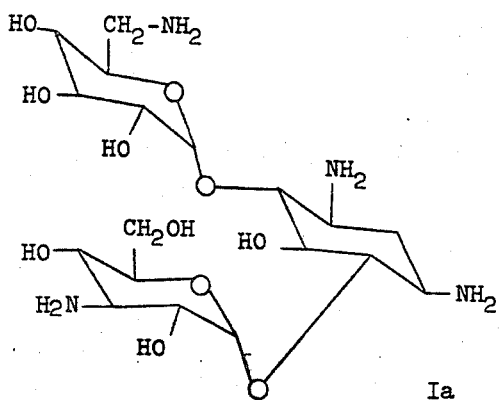

Ia

Kanamycin B is a compound having the formula

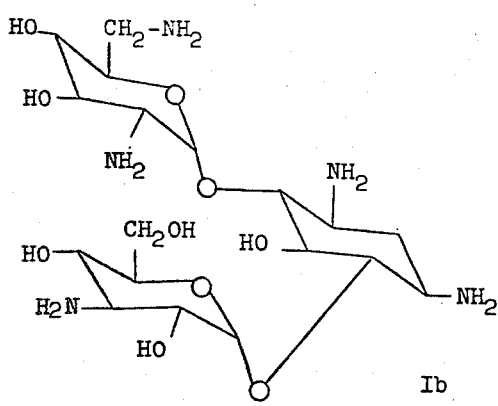

Ib

The compound designated 1-[L-(-)-γ-amino-α-hydroxybutyryl]-kanamycin A [BB-K8] is described in the Journal of Antibiotics, 25 (12), pp. 695–731 (December, 1972).

SUMMARY OF THE INVENTION

The compound having the formula

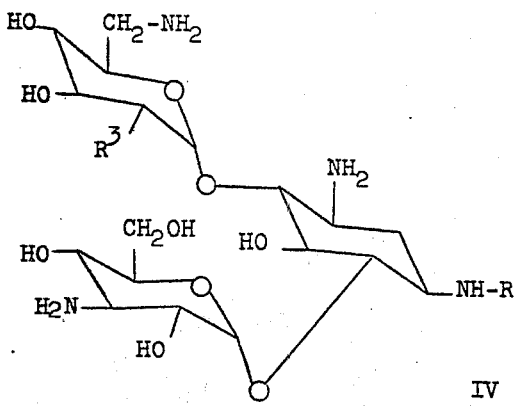

IV in which $R^3$ is OH or $NH_2$ and R is L-(−)-β-amino-α-hydroxypropionyl; or a nontoxic pharmaceutically acceptable acid addition salt thereof is a valuable antibacterial agent.

This invention relates to semi-synthetic derivatives of kanamycin A and B, said compounds being known as 1-[L-(−)-β-amino-α-hydroxypropionyl]-kanamycin A and B having the formula

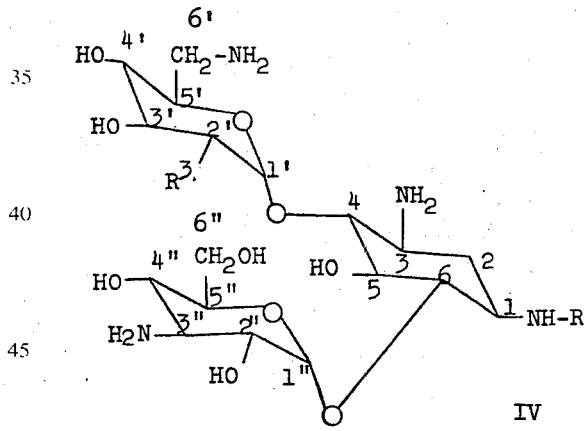

IV in which $R^3$ is OH or $NH_2$ and R is L-(−)-β-amino-α-hydroxypropionyl; or a nontoxic pharmaceutically acceptable acid addition salt thereof.

For the purpose of this disclosure, the term "nontoxic, pharmaceutically acceptable acid addition salt" shall mean a mono, di-, tri-, tetra or pentasalt formed by the interaction of one molecule of compound IV with 1–5 moles of a nontoxic, pharmaceutically acceptable acid. Included among these acids are acetic, hydrochloric sulfuric, maleic, phosphoric, nitric, hydrobromic, ascorbic malic and citric acid, and those other acids commonly used to make salts of amine containing pharmaceuticals.

The compounds of the present invention are prepared by the following diagramatic scheme:

1.) Kanamycin A (Ia) or Kanamycin B (Ib) →[N-(Benzyloxycarbonyloxy) Succinimide]
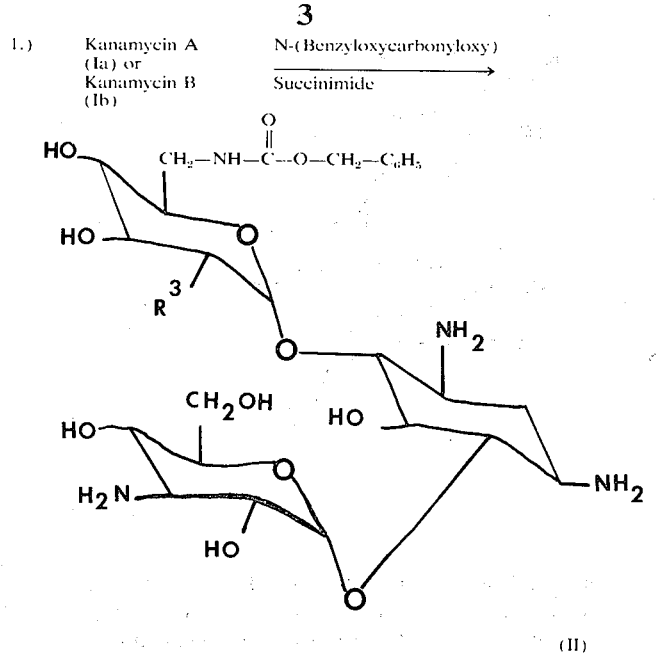
(II)
2.) Compound II →[N-Hydroxysuccinimide ester of L-(-)-β-benzyloxycarbonyl-amino-β-hydroxypropionic acid]
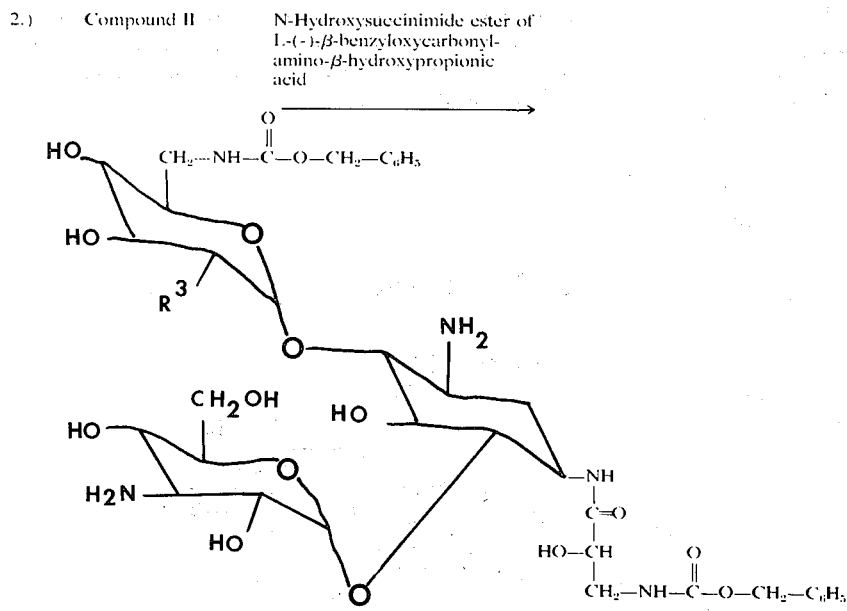
III
3.) Compound III →[H₂/Pd/C]
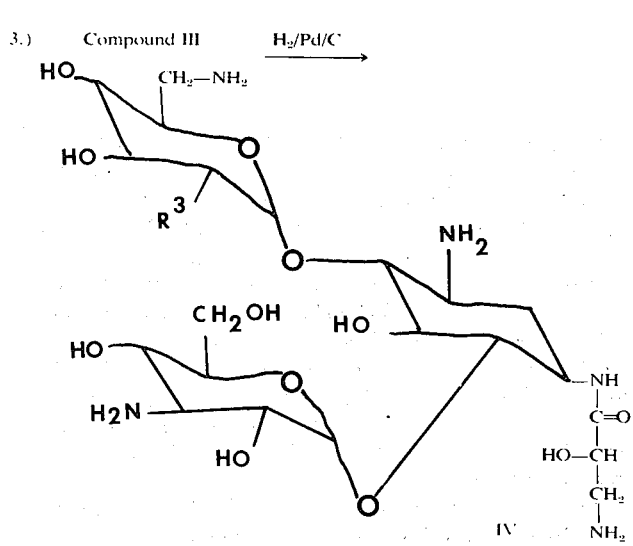
IV A preferred embodiment of the present invention is the compound having the formula

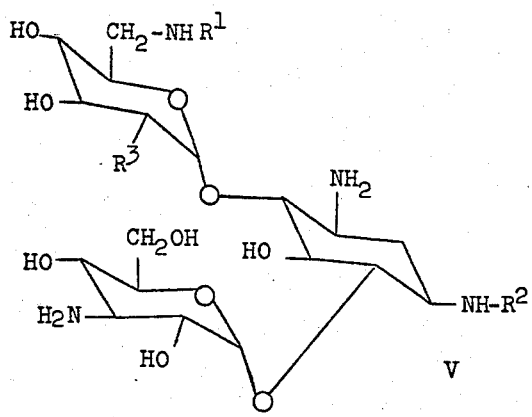

in which $R^1$ is H or

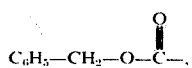

$R^2$ is H or L-(—)-$\beta$-amino-$\alpha$-hydroxypropionyl and $R^3$ is OH or $NH_2$ wherein $R^1$ or $R^2$ must be other than H; or a nontoxic pharmaceutically acceptable acid addition salt thereof.

Another preferred embodiment is the compound of formula V in which $R^1$ is

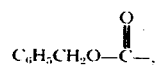

$R^2$ is H and $R^3$ is OH or $NH_2$.

A preferred embodiment is the compound of formula V in which $R^2$ is L-(—)-$\beta$-amino-$\alpha$-hydroxypropionyl, $R^1$ is hydrogen and $R^3$ is OH or $NH_2$.

A most preferred embodiment is the compound of formula V wherein $R^1$ is H, $R^2$ is L-(—)-$\beta$-amino-$\alpha$-hydroxypropionyal and $R^3$ is OH; or a nontoxic pharmaceutically acceptable acid addition salt thereof.

Another more preferred embodiment is the compound of formula V wherein $R^1$ is H, $R^2$ is L-(—)-$\beta$-amino-$\alpha$-hydroxypropionyl and $R^3$ is $NH_2$; or a nontoxic pharmaceutically acceptable acid addition salt thereof.

Other most preferred embodiments are the sulfate, hydrochloride, acetate, maleate, citrate, ascorbate, nitrate or phosphate salts of compound V.

Another more preferred embodiment is the monosulfate salt of compound V.

Still another preferred embodiment is the disulfate salt of compound V.

The objectives of the present invention have been achieved, by the provision according to the present invention of the process for the preparation of the compound having the formula

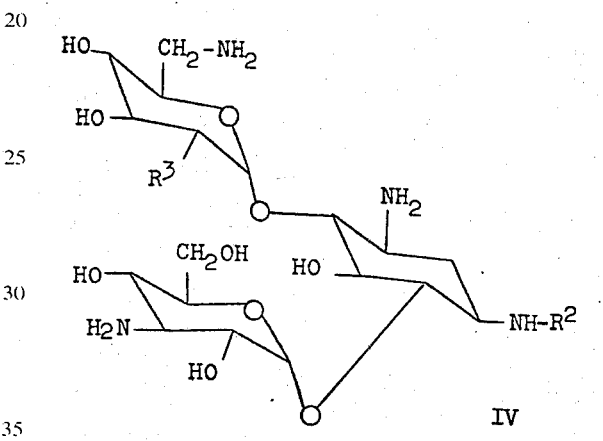

in which $R^2$ is L-(—)-$\beta$-amino-$\alpha$-hydroxypropionyl and $R^3$ is OH or $NH_2$; or a nontoxic pharmaceutically acceptable acid addition salt thereof; which process comprises the consecutive steps of A. acylating kanamycin A or kanamycin B with an acylating agent selected from the compounds having the formulas

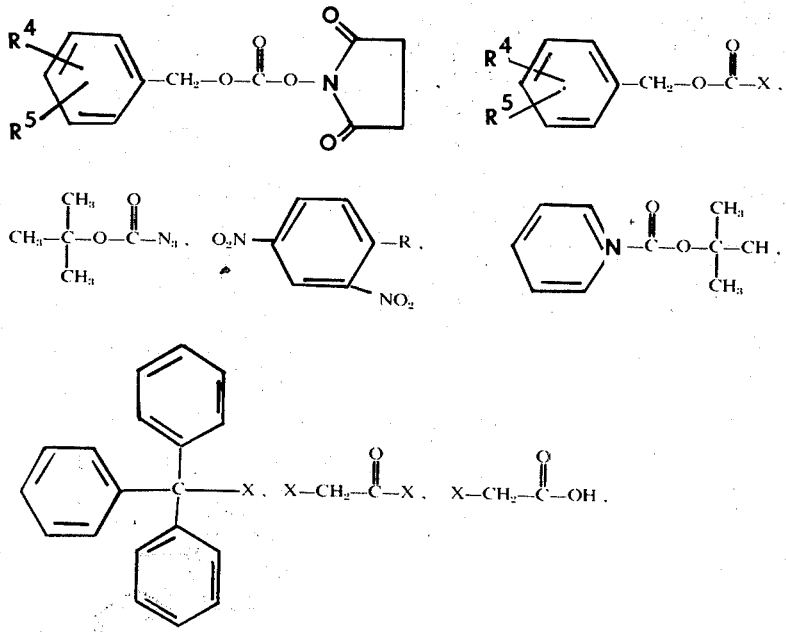

(or a carbodiimide thereof) or

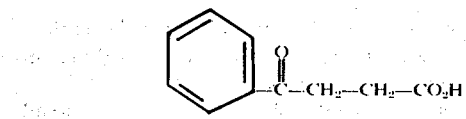

(or a carbodiimide thereof), in which $R^4$ and $R^5$ are alike or different and each is H, F, Cl, Br, $NO_2$, OH, (lower)alkyl or (lower)alkoxy, X is chloro, bromo or iodo, or a functional equivalent as an acylating agent;

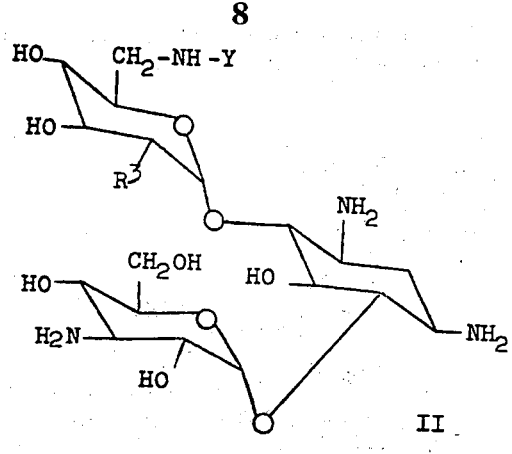

in which Y is a radical of the formula

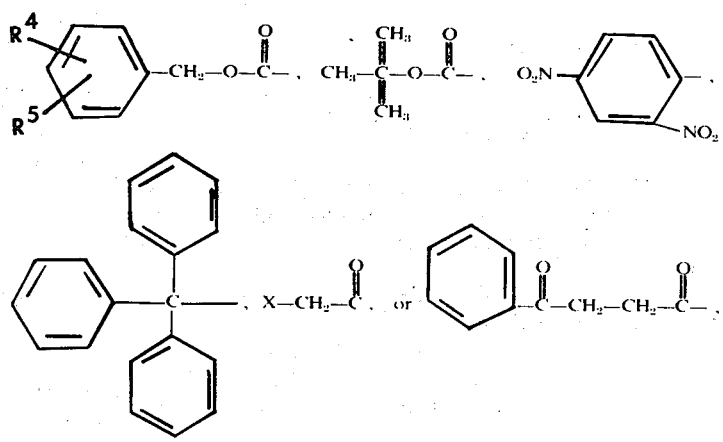

in which $R^4$, $R^5$ and $R^3$ are as defined above;

B. acylating compound II with an acylating agent having the formula

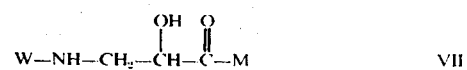

in which W is a radical selected from the group comprising in a ratio of one mole or less of acylating agent per mole of kanamycin A or B in a solvent, preferably selected from the group comprised of dimethylformamide, dimethylacetamide, tetrahydrofuran, dioxane, 1,2-dimethoxyethane, methanol, ethanol, water, acetone, pyridine, N-(lower)alkylpiperidine, or mixtures thereof, but preferably dimethylformamide-water, at a temperature below 50°C. and preferably below 25° C., to produce the compound having the formula

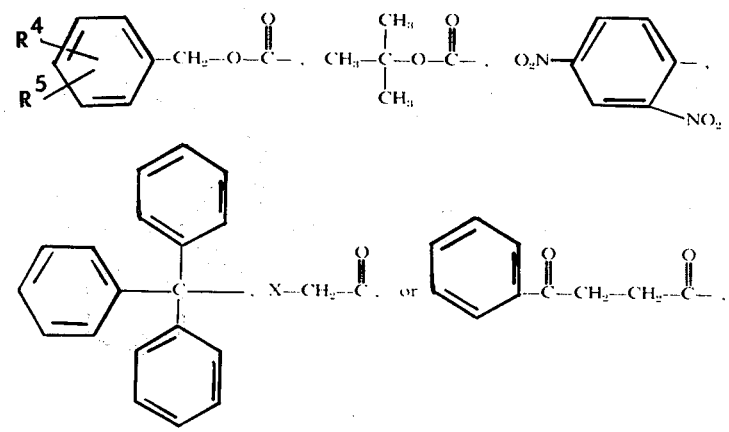

but preferably

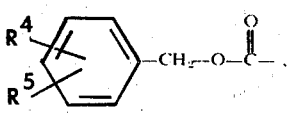

M is a radical selected from the group comprising

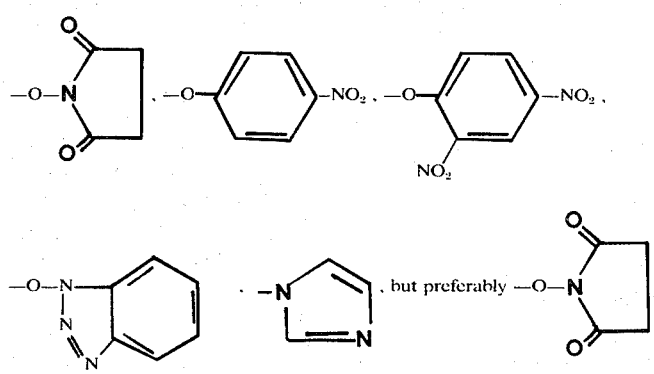

in which $R^4$ and $R^5$ are as above; in a ratio of at least 0.5 mole of compound VII per mole of compound II, but preferably in a ratio of about 0.5 to about 1.4, and most preferably in a ratio of about 0.8 to about 1.1, in a solvent preferably selected from the group comprising a mixture of water and ethyleneglycol dimethyl ether, dioxane, dimethylacetamide, dimethylformamide, tetrahydrofuran, propyleneglycol dimethyl ether, or the like but preferably 1:1 water-tetrahydrofuran, to produce a compound of the formula

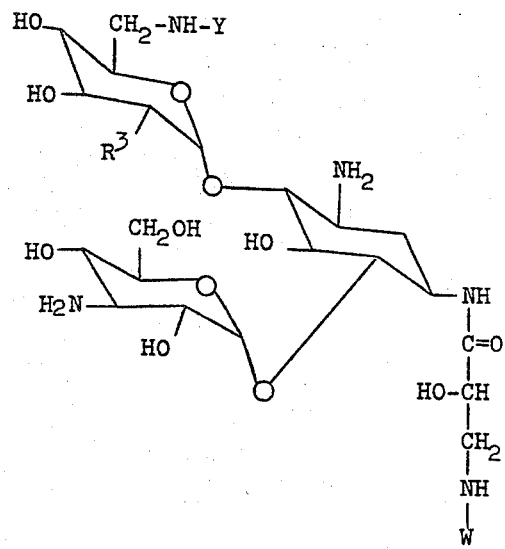

in which $R^3$, Y and W are as above; and

C. removing the blocking groups W and Y from compound III by methods commonly known in the art, and preferably when W and Y are radicals of the formula

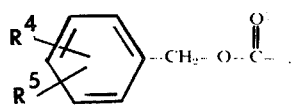

by hydrogenating compound III with hydrogen in the presence of a metal catalyst, preferably selected from the group comprising palladium, platinum, Raney nickel, rhodium, ruthenium and nickel, but preferably palladium, and most preferably palladium on charcoal, in a water-water miscible solvent system, preferably selected from the group comprising water and dioxane, tetrahydrofuran, ethyleneglycol dimethyl ether, propyleneglycol dimethyl ether, or the like, but preferably 1:1 water tetrahydrofuran to produce the compound of formula IV.

It should be apparent to those knowledgeable in the art that other agents can be used in the process above to acylate the amine functions of the intermediate compounds of the instant invention. This disclosure is meant to include all such acylating agents that produce labile amine blocking groups, said labile blocking groups commonly employed in the synthesis of peptides. The labile blocking groups must be readily removable by methods commonly known in the art. Examples of said labile blocking groups and their removal can be found in the review of A. Kapoor, J. Pharm. Sciences, 59, pp. 1–27 (1970). Functional equivalents as acylating agent for primary amine groups would include corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester of thioester (e.g., with p-nitrophenol, 2,4-dinitrophenol, thiophenol, thioacetic acid) may be used or the free acid itself may be coupled with the kanamycin derivative (II) after first reacting said free acid with N,N'-dimethylchloroforminium chloride [cf. Great Britain 1,008,170 and Novak and Weichet, Experientia XXI/6, 360 (1965)] or by the use of enzymes or of an N,N'-carbonyldiimidazole or an N,N'-carbonylditriazole [cf. Sheehan and Hess, J Amer. Chem. Soc., 77, 1067, (1955)] or of alkynylamine reagent [cf. R. Buijile and H. G. Viehe, Angew Chem., International Edition 3, 582 (1964)], or of a ketenimine reagent [cf. C. L. Stevens and M. E. Monk J. Amer. Chem. Soc, 83, 1010 (1961)]. Another equivalent of the acid chloride is a corresponding azolide i.e., an amide of the corresponding acid whose amide nitrogen is a member of a quasiaromatic five membered ring containing at least two nitrogen atoms, i.e. imidazole, pyrazole, the triazoles, benzimidazole, benzotriazole and their substituted derivatives. As an ex ample of the general method for the preparation of an azolide, N,N'-carbonyldiimidazole is reacted with a carboxylic acid in equimolar proportions at room temperature in tetrahydrofuran, chloroform, dimethylformamide, or a similar inert solvent to form the carboxylic acid imidazolide in practically quantitative yield with liberation of carbon dioxide and one mole of imidazole. Dicarboxylic acids yield diimidazolides. The byproduct, imidazole, precipitates and may be separated and the imidazolide isolated, but this is not essential. These reactions are well-known in the art (cf. U.S. Pat. Nos. 3,079,314, 3,117,126 and 3,129,224 and British Pat. Nos. 932,644, 957,570 and 959,054).

Compound IVa, 1-[L-(−)-β-amino-α-hydroxypropionyl]-kanamycin A and compound IVb, 1-[L-(−)β-amino-α-hydroxypropionyl]-kanamycin B, possess excellent antibacterial activity that appears superior in some respects against certain pathogenic microorganisms than kanamycin A or B respectively.

Illustrated below are two tables showing the minimal inhibitory concentrations (MIC's) of kanamycin A to compound IVa (BB-K101) and kanamycin B compared to compound IVb (BB-K122) against a variety of gram-positive and gram-negative bacteria as obtained by the Steers agar-dilution method. Mueller-Hinton agar medium was used in the study of both tables.

TABLE I

| | MIC (mcg./ml.) | (MIC mg./ml.) | BB-K101 (IVa) | Kanamycin A |
|---|---|---|---|---|
| E. coli | NIHJ | | 1.6 | 0.8 |
| " | Juhl | A15119 | 1.6 | 1.6 |
| " | | A15159 | 1.6 | 1.6 |
| " | KM-R | A20363 | 1.6 | >100 |
| " | | A9844 | 0.8 | 0.8 |
| " | KM-R | A20365 | 0.4 | 100 |
| " | K-12 | | 1.6 | 0.8 |
| " | " KM-R | A20664 | 1.6 | 6.3 |
| " | " KM-R | A20665 | 0.8 | 100 |
| " | W677 | A20684 | 1.6 | 0.8 |
| " | JR/W677 | A20683 | 1.6 | >100 |
| K. pneumoniae | D-11 | | 0.4 | 0.2 |
| " Type 22 | No. 3038 | A20680 | 1.6 | >100 |
| S. marcescens | | A20019 | 1.6 | 1.6 |
| P. aeruginosa | D-15 | | 3.1 | 12.5 |
| " H9 | D-113 | KM-R | 6.3 | >100 |
| " | | A9923 | 6.3 | 50 |
| " | | A9930 | 0.4 | 12.5 |
| " | | A15150 | 6.3 | 100 |
| " | | A15194 | 3.1 | 25 |
| " | GM-R | A20717 | 6.3 | 50 |
| " | GM-R | A20718 | 6.3 | 50 |
| P. vulgaris | | A9436 | 0.4 | 0.4 |
| " | | A9526 | 0.4 | 0.4 |
| P. mirabilis | | A9554 | 0.8 | 0.8 |
| " | | A9900 | 0.8 | 0.8 |
| P. morganii | | A9553 | 0.8 | 0.8 |
| " | | A20031 | 0.8 | 0.8 |
| S. aureus Smith | | | 0.4 | 0.4 |
| " 209P | SM-R | | 1.6 | 1.6 |
| " | KM-R | A20239 | 1.6 | 100 |
| Mycobacterium | 607 | | 0.8 | 0.4 |
| " | " KM-R | | >100 | >100 |
| " | " KM,SM-R | | >100 | >100 |
| " | phlei | | 0.4 | 0.4 |
| " | ranae | | 0.8 | 0.4 |

KM-R is kanamycin resistant.
GM-R is gentamicin resistant.
SM-R is streptomycin resistant.

TABLE II

| MIC (mcg./ml.) | | (MIC's mg./ml.) BB-K122 (IVb) | BB-K123 | BB-K124 | Kanamycin B |
|---|---|---|---|---|---|
| E. coli | NIHJ | 0.8 | 3.1 | 3.1 | 0.4 |
| " | Juhl | | | | |
| | A15119 | 0.8 | 6.3 | 3.1 | 0.8 |
| " | A15169 | 0.8 | 3.1 | 3.1 | 0.8 |
| " | KM-R | | | | |
| | A20363 | 0.8 | 25 | 3.1 | 100 |
| " | A9844 | 0.8 | 3.1 | 3.1 | 0.4 |
| " | KM-R | | | | |
| | A20365 | 0.2 | 6.3 | 1.6 | 50 |
| " | K-12 | 0.4 | 3.1 | 3.1 | 0.4 |
| " | " KM-R | | | | |
| | A20664 | 0.4 | 6.3 | 3.1 | 0.8 |
| " | " KM-R | | | | |
| | A20665 | 0.2 | 6.3 | 1.6 | 25 |
| " | W677 | | | | |
| | A20684 | 0.4 | 3.1 | 3.1 | 0.8 |

TABLE II—Continued

| MIC (mcg./ml.) | | (MIC's mg./ml.) BB-K122 (IVb) | BB-K123 | BB-K124 | Kanamycin B |
|---|---|---|---|---|---|
| " | JR/W677 | | | | |
| | A20683 | 1.6 | 50 | 3.1 | 100 |
| K. pneumoniae | D-11 | 0.2 | 1.6 | 0.8 | 0.1 |
| " Type 22 | 3038 | | | | |
| | A20680 | 1.6 | 50 | 6.3 | >100 |
| S. marcescens | A20019 | 1.6 | 6.3 | 3.1 | 0.8 |
| P. aeruginosa | D-15 | 0.8 | 25 | 3.1 | 6.3 |
| " H9 | D-113 | | | | |
| | KM-R | 12.5 | >100 | 50 | >100 |
| " | A9923 | 3.1 | >100 | 12.5 | 25 |
| " | A9930 | 0.4 | 12.5 | 1.6 | 6.3 |
| P. aeruginosa | A15150 | 3.1 | >100 | 25 | 25 |
| " | A15195 | 1.6 | 100 | 6.3 | 12.5 |
| | GM-R | | | | |
| "GM-R | A20717 | 3.1 | >100 | 25 | 50 |
| | A20718 | 3.1 | 100 | 12.5 | 25 |
| P. vulgaris | A9436 | 0.2 | 1.6 | 1.6 | 0.2 |
| " | A9526 | 0.4 | 3.1 | 3.1 | 0.2 |
| P. mirabilis | A9554 | 0.8 | 3.1 | 6.3 | 0.4 |
| " | A9900 | 0.8 | 3.1 | 3.1 | 0.8 |
| P. morganii | A9553 | 0.8 | 6.3 | 6.3 | 0.8 |
| | A20031 | 0.8 | 6.3 | 6.3 | 0.8 |
| S. aureus Smith | | 0.2 | 0.8 | 0.8 | 0.1 |
| " | 209P SM-R | 0.8 | 3.1 | 6.3 | 0.8 |
| "KM-R | | | | | |
| | A20239 | 0.8 | 25 | 6.3 | 50 |
| Mycobacterium | 607 | 0.8 | 6.3 | 3.1 | 1.6 |
| " KM-R | " | 100 | 100 | 100 | 100 |
| " | KM.SM-R | 100 | 100 | 100 | 100 |
| " | phlei | 0.8 | 6.3 | 1.6 | 1.6 |
| | ranae | 0.8 | 6.3 | 3.1 | 1.6 |

The above MIC data show that compounds IVa and IVb are substantially more active against a number the test organisms, particularly the pseudomonas and other kanamycin resistant organisms.

The compounds IV are valuable as antibacterial agents, nutritional supplements in animal feeds, therapeutic agents in poultry and animals, including man, and are especially valuable in the treatment of infectious diseases caused by Gram-positive and Gram-negative bacteria.

The compounds IV when administered orally are useful as an adjunctive treatment for preoperative sterilization of the bowel. Both aerobic and anaerobic flora which are susceptible to these drugs are reduced in the large intestine. When accompanied by adequate mechanical cleansing, they are useful in preparing for colonic surgery.

The compounds IV are effective in the treatment of systemic bacterial infections in man when administered parenterally in the dosage range of about 250 mg. to about 3000 mg. per day in divided doses three or four times a day. Generally the compounds are effective when administered at a dosage of about 5.0 to 7.5 mg./kg. of body weight every 12 hours.

EXAMPLES

EXAMPLE 1

Preparation of L-β-Benzyloxycarbonylamino-α-hydroxypropionic Acid (VI).

L-β-Amino-α-hydroxypropionic acid* (8.2 g., 0.078 mole) was dissolved in a solution of 6.56 g. (0.0164 mole) of sodium hydroxide and in 60 ml. of water. To the stirred solution was added dropwise 14.7 g. (0.086 mole) of carbobenzoxy chloride below 5° C. The mixture was stirred for an hour at room temperature, washed with 60 ml. of ether and adjusted to pH 2 with dilute HCl. The precipitate was collected by filtration, washed with water and air-dried to give 9.65 g. (52 percent) of VI. The filtrate was extracted with five 100-ml. portions of ether. The ethereal solution was washed with water, dried over sodium sulfate and evaporated to dryness in vacuo to give additional 2.0 g. (11 percent) of VI. A total of 11.65 g. of VI was crystallized from 500 ml. of benzene-ethyl acetate (4:1) to give 9.36 g. (50 percent) of pure VI, m.p. 128.5°–129.5° C. Infrared (IR) (KBr): $\gamma_{C=O}$ 1745, 1690 cm$^{-1}$. $[\alpha]_D^{25°}$ +2.9° (c 5.0, MeOH). Nuclear Magnetic Resonance Spectra [NMR (DMSO-d$_6$)]: γ (in ppm) 3.05–3.45 (2H, m, CH$_2$N), 4.05

(1H, d—d, —O—CH—CO—), 5.03 (2H, s, CH$_2$Ar) 7.18 (1H, broad, NH), 7.36 (5H, s, ring H).

Anal. calc'd. for C$_{11}$H$_{13}$NO$_5$: C, 55.23; H, 5.48; N, 5.86. Found: C, 55.34; H, 5.49; N, 5.87. *K. Freudenberg, Ber., 47, 2027 (1914).

EXAMPLE 2

N-Hydroxysuccinimide Ester of L-β-benzyloxycarbonylamino-α-hydroxypropionic Acid (VII).

To a chilled and stirred solution of 478 mg. (2 m.moles) of VI and 230 mg. (2 m.moles) of N-hydroxysuccinimide in 10 ml. of tetrahydrofuran (THF) was added 412 mg. (2 m.moles) of dicyclohexylcarbodiimide. The mixture was stirred for an hour at 0°–5° C., for 2 hours at room temperature and then filtered to remove the N,N'-dicyclohexylurea. The filtrate containing VII was used for the next reaction without isolation.

EXAMPLE 3

Preparation of 1-[L-(-)-β-amino-α-hydroxypropionyl]-kanamycin A (IVa, BB-K101).

To a stirred solution of 1.48 g. (2.4 m.moles) of 6'-carbobenzoxykanamycin A (IIa) in 25 ml. of water-THF (4:1) was added dropwise the solution of VII at 5° C. The mixture was stirred for two hours at room temperature and filtered to remove a small amount of insoluble material. The filtrate was hydrogenated overnight with 300 mg. of 10 percent palladium on charcoal at room temperature at atmospheric pressure and then filtered to remove the catalyst. The filtrate was concentrated in vacuo to remove most of the organic solvent. The resultant aqueous solution was adjusted to pH 7 with dilute HCl and passed through a column of Amberlite CG-50 ($NH_4^+$, 80 ml.), which was washed with 200 ml. of water and then eluted with 400 ml. of 0.1 N, 870 ml. of 0.2 N, and 430 ml. of 0.5 N $NH_4OH$. The eluate was collected in 10-ml. fractions. Fraction numbers 95–106 which showed activity against Pseudomonas aeruginosa A9843 and Rf values at 0.25 and 0.41 (desired product) by thin layer chromatography (TLC) on a silica gel plate (S-110, ninhydrin)* were pooled, evaporated, in vacuo and freeze-dried to give 170 mg. of crude IVa.

The crude IVa (162 mg.) was adsorbed on a column of CG-50 (cupro-ammonium form*, 15 ml.), which was washed with 50 ml. of water and eluted with 1 L of 0.2 N, 700 ml. of 0.5 N and finally 400 ml. of 1.0 N $NH_4OH$. The eluate was collected in 7-ml. fraction. Tube numbers 269–282 which showed a single spot at Rf 0.41 was combined, evaporated in vacuo and lyophilized to give 79 mg. of copper complex of IVa. The copper was removed by column chromatography on CG-50 ($NH_4^+$, 5 ml.) using 0.2 N $NH_4OH$ as an eluent. The eluate was collected in 10-ml. fraction. Tube numbers 2–10 were combined, evaporated in vacuo and lyophilized to give 26 mg. (2 percent based on VI of IVa, m.p. 200°–205° C. IR (KBr): 1640, 1540 $cm^{-1}$.

Anal. calc'd. for $C_{21}H_{41}N_5O_{13} \cdot 2H_2CO_3 \cdot 3H_2O$: C, 36.84; H, 6.84; N, 9.34. Found: C, 36.93; H, 6.00; N, 9.62.

*The cupro-ammonium form of CG-50 was prepared in the following way: to a stirred suspension of CG-50 ($NH_4^+$) in water was added 10 percent cupric sulfate solution to give copper salt of CG-50 which was filtered. The resin was washed several times with water, then treated with 1N $NH_4OH$ under stirring, filtered and washed several times with water to give deep blue, cupro-ammonium form of CG-50.

**Amberlite CG-50 is the tradename for the chromatographic grade of a weakly acidic cationic exchange resin of a carboxylic-polymethacrylic type.

***TLC: silica gel plate, $CHCl_3$-MeOH-28% $NH_4OH$-$H_2O$ (1:4:2:1).

EXAMPLE 4

Preparation of N-(Benzyloxycarbonyloxy)succinimide.

N-hydroxysuccinimide[1] (23 g., 0.2 mole) was dissolved in a solution of 9 g. (0.22 mole) of sodium hydroxide in 200 ml. of water. To the stirred solution was added dropwise 34 g. (0.2 mole) of carbobenzoxy chloride with water-cooling and then the mixture was stirred at room temperature overnight to separate the carbobenzoxy derivative which was collected by filtration, washed with water and air-dried. Yield 41.1 g. (82 percent). Recrystallization from benzene-n-hexane (10:1) gave colorless prisms melting at 78°–79° C. 1. G. W. Anderson et al., J. Am. Chem. Soc., 86, 1839 (1964).

EXAMPLE 5

Preparation of 6'-Carbobenzoxykanamycin A (IIa).

A solution of 42.5 g (90 m.moles) of kanamycin A free base in 450 ml. of water and 500 ml. of dimethylformamide (DMF) was cooled below 0° C. and stirred vigorously. To the solution was added dropwise over a period of about two hours a solution of 22.4 g. (90 m.mole) of N-(benzyloxycarbonyloxy)succinimide in 500 ml. of DMF. The mixture was stirred at −10° to 0° C. overnight and then at room temperature for one day. The reaction mixture was evaporated under reduced pressure below about 50° C. The oily residue was dissolved in a mixture of 500 ml. water and 500 ml. butanol, the mixture being filtered to remove insoluble material and separated into two layers. The butanol and aqueous layers were treated with butanol-saturated water (500 ml. × 2) and water-saturated butanol (500 ml. × 2), respectively, using a technique similar to counter current distribution. The three aqueous layers were combined and evaporated to dryness under reduced pressure to give an oily residue, a part of which crystallized on standing at room temperature. To the residue including the crystals was added about 100 ml. of methanol, which dissolved the oil and separated it from the crystals. After adding about 300 ml. of ethanol, the mixture was kept at room temperature overnight to give a crystalline mass which was collected by filtration. It weighed 44 g. The product contained a small amount of kanamycin A as indicated by thin layer chromatography using n-propanolpyridine-acetic acid-water (15:10:3:12) as the solvent system and ninhydrin as the spray reagent.

The crude product was dissolved in 300 ml. of water and chromatographed on a column (30 mm. diameter) of CG-50 ion-exchange resin ($NH_4$ 115 type, 500 ml.). The column was irrigated with 0.1 N ammonium hydroxide solution and the eluate was collected in 10-ml. fraction. The desired product was contained in tube numbers 10–100, while kanamycin A recovered from slower-moving fractions and the position isomer(s) of the product seemed to be contained in the faster-moving fractions. The fractions 10–110 were combined and evaporated to dryness under reduced pressure to give 24.6 g. (45 percent) of a colorless product 6'-carbobenzoxykanamycin A (II) [6'-Cbz-kanamycin A], which began to melt and color at 204° C. and decomposed at 212° C. with gas evolution $[\alpha]_D + 106°$ (c=2, $H_2O$).

| TLC (silica gel $F_{254}$; ninhydrin) Solvent System | Rf value 6'-Cbz-Kanamycin A | Kanamycin A |
|---|---|---|
| n-ProH-Pyridine-AcOH-$H_2O$ (15:10:3:12) | 0.42   0.33   0.4 (main)   minor | 0.04 |
| Acetone-AcOH-$H_2O$ (20:6:74) | 0.24 | 0.14 |
| $CHCl_3$-MeOH-c.$NH_4OH$-$H_2O$ (1:4:2:1) | 0.76 | 0.50 |
| AcOMe-n-PrOH-C.$NH_4OH$ (45:105:60) | 0.22* | 0.04* |

*Detected by anthrone-sulfuric acid.

The final product was found to be accompanied by two minor components by TLC with one of the solvent systems tested. However, the final product was used without further purification for the preparation of BB-K101 (IVa).

EXAMPLE 6

Preparation of 6'-Carbobenzoxykanamycin B (IIb).

To a chilled solution of 8.1 g. (0.0168 mole) of kanamycin B in 120 ml. of water and 80 ml. of 1,2-dimethoxyethane was added dropwise with stirring a solution of 4.2 g. (0.0168 mole) of N-(benzyloxycarbonyloxy)succinimide in 40 ml. of 1,2-dimethoxyethane. The reaction mixture was stirred overnight and evaporated under reduced pressure. The residue was dissolved in 100 ml. of water and shaken twice with 50 ml. of water-saturated n-butanol. The aqueous layer was separated and adsorbed on a column of 100 ml. of CG-50 ($NH_4^+$type). The column was washed with 200 ml. of water, eluted with 0.05 N $NH_4OH$. The eluate was collected in 10-ml. fraction. Fractions 121 to 180 were collected, evaporated and freeze-dried to give 1.58 g. (15 percent) of the desired product. Fractions 1 to 120 were evaporated and re-chromatographed on CG-50 ($NH_4^+$) to give 1.21 g. (12 percent) of the product (IIb). M.p. 151°–152° C. (dec.). $[\alpha]_D^{24}+104°$ (C. 2.5, $H_2O$). $\gamma_{c=0}$1710 cm.$^{-1}$.

Anal. calc'd. for $C_{26}H_{43}N_4O_{12}$: C, 50.56; H, 7.02; N, 11.34. Found: C, 50.71; H, 7.38; N, 11.48.

TLC (silica gel F254), RF 0.03 in n-PrOH-pyridine-AcOH-$H_2O$ (15:10:3:12); Rf 0.16 in acetone-AcOH-$H_2O$ (20:6:74).

EXAMPLE 7

Preparation of 1-[L-(−)-β-Amino-α-hydroxypropionyl]-kanamycin B [BB-K122 (IVb)].

To a stirred solution of 1.23 g. (2.0 m.moles) of IIb in 20 ml. of water was added dropwise a solution of VII prepared from 478 mg. (20 m.moles) of VI in 20 ml. of THF at room temperature. The mixture was stirred overnight and then hydrogenated overnight over 300 mg. of 10 percent palladium on charcoal at room temperature at atmospheric pressure. The hydrogenated mixture was filtered and the filtrate was concentrated in vacuo to remove most of the organic solvent. The resultant aqueous solution was adjusted to pH 7 with 1 N hydrochloric acid and adsorbed on a column of CG-50 ($NH_4^+$, 40 ml.) which was washed with 80 ml. of water and then eluted with 900 ml. of 0.1 N and 1.2 L of 0.2 N $NH_4OH$. The eluate was collected in 10-ml. fraction, monitored by ninhydrin spot test, TLC with S-110 system and disk assay using *Pseudomonas aeruginosa* A9843, and cut into the following appropriate fractions. Each fraction was evaporated in vacuo and freeze-dried.

| Fraction | Tube No. | $NH_4OH(N)$ | Weight | Identity |
|---|---|---|---|---|
| 1 | 91–113 | 0.2 | 420 mg. | kanamycin B |
| 2 | 121–143 | '' | 253 mg. | BB-K122 (IVb) + BB-K123 + kanamycin B |
| 3 | 157–196 | '' | 66 mg. | BB-K124 (diacylated compound) |

Fraction 2 (250 mg.) in 30 ml. of water was adjusted to pH 7 with 1 N hydrochloric acid and passed through a column of CG-50 (cupro-ammonium form, 14 ml.), which was washed with 50 ml. of water and eluted with 2.5 L of 1.0 N $NH_4OH$ and 1.5 L of 1.5 N $NH_4OH$. The eluate was collected in 10-ml. fraction and cut into the appropriate fractions on the basis of the Rf values of TLC and activity against *Pseudomonas aeruginosa*.

| Fraction | Tube No. | $NH_4OH(N)$ | Weight | Identity |
|---|---|---|---|---|
| 1' | 191–240 | 1.0 | 126 mg. | copper complex of BB-K123 |
| 2' | 331–360 | 1.5 | 80 mg. | copper complex of the desired BB-K122 |
| 3' | 361–385 | '' | 41 mg. | copper complex of kanamycin B |

Chromatography of fraction 2' (80 mg.) in order to remove copper afforded 35 mg. (3 percent) of BB-K122 (IVb).

In the same way 27 mg. (2.4 percent) of BB-K123 was obtained from 126 mg. of fraction 1'.

The physico-chemical data of these compounds are given in the following Table.

| BB-K No. | IR (cm$^{-1}$) | (M.p. (°C.)) | Rf (S-110, ninhydrin) |
|---|---|---|---|
| 122 | 1640,1570 | 192–196 | 0.41 |
| 123 | 1640,1570 | 177–180 | 0.35 |
| 124 | 1650,1550 | 179–185 | 0.21 (main), 0.31 |

MICROANALYSIS DATA

BB-K122: Anal. calc'd. for $C_{21}H_{42}N_6O_{12}\cdot 2H_2CO_3$: C, 39.77; H, 6.67; N, 12.10. Found: C, 39.84; H, 6.23; N, 11.66

BB-K123: Anal. calc'd. for $C_{21}H_{42}N_6O_{13}\cdot 3H_2CO_3$: C, 38.10; H, 6.39; N, 11.11 Found: C, 36.84; H, 6.33; N, 11.26.

BB-K124: Anal. calc'd. for $C_{24}H_{47}N_7O_{14}\cdot 3H_2CO_3$: C, 38.43; H, 6.33; N, 11.62. Found: C, 38.28; H, 5.95; N, 11.43.

These three compounds regenerated isoserine and kanamycin B by hydrolysis with 0.5 N NaOH at 100° for an hour.

The identities of the compounds BB-K123 and BB-K124 were not established although it is known that BB-K123 is a monoacylated derivative of kanamycin B and BB-K124 is a diacylated derivative of kanamycin B. The compounds have weak antibacterial activity as compared to kanamycin B and BB-K122 (IVb). See Table II.

EXAMPLE 8

Preparation of the Monosulfate Salt of 1-[L-(−)-β-amino-α-hydroxypropionyl]-kanamycin A or B.

One mole of 1-[L-(−)-β-amino-α-hydroxypropionyl]-kanamycin A or B is dissolved in 1 to 3 liters of water. The solution is filtered to remove any undissolved solids. To the chilled and stirred solution is added one mole of sulfuric acid dissolved in 500 ml. of water. The mixture is allowed to stir for 30 minutes, following which cold ethanol is added to the mixture till precipitation occurs. The solids are collected by filtration and are determined to be the desired monosulfate salt.

EXAMPLE 9

Preparation of the Disulfate Salt of 1-[L-(−)-β-amino-α-hydroxypropionyl]-kanamycin A or B.

35 grams of 1-[L-(−)-β-amino-α-hydroxypropionyl]-kanamycin A or B (as the monobicarbonate trihydrate) is dissolved in 125 ml. of deionized water. The pH is adjusted to 7-7.5 with 50 percent V/V sulfuric acid.

Eight and one half grams of Darco G-60 (activated charcoal) is added and the mixture is slurried for 0.5 hour at ambient room temperature. The carbon is removed by suitable filtration and washed with 35 ml. of deionized water. The water is added to the filtrate.

The combined filtrate-wash is adjusted to pH 1–1.3 with 50 percent V/V sulfuric acid. This solution is added with rapid stirring over a ten minute period to 600–800 ml. of methanol (3–4 volumes of methanol). The mixture is stirred for five minutes at pH 1–1.3, passed through a 100 mesh screen, stirred for two minutes and allowed to settle for five minutes. Most of the supernatant is decanted. The remaining slurry is suitably filtered, washed with 200 ml. of methanol and vacuum dried at 50°C. for 24 hours to yield the appropriate disulfate salt.

We claim:

1. A compound having the formula

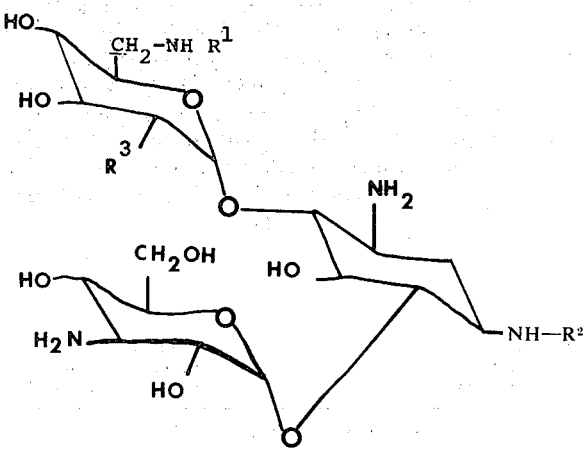

in which $R^1$ is H, $R^2$ is L-(−)-β-amino-α-hydroxypropionyl and $R^3$ is OH or $NH_2$; or a nontoxic pharmaceutically acceptable salt thereof.

2. The compound having the formula

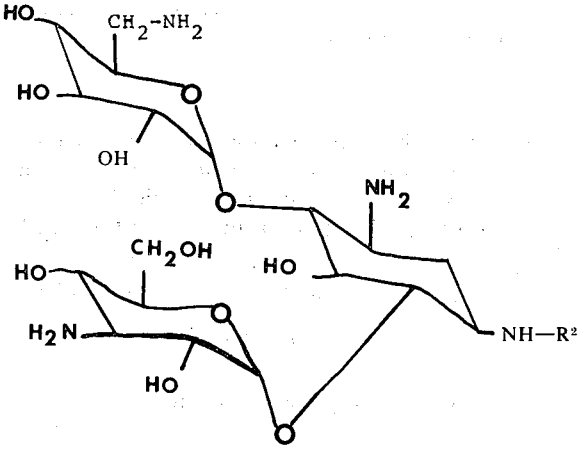

in which $R^2$ is L-(−)-β-amino-α-hydroxypropionyl; or a nontoxic pharmaceutically acceptable salt thereof.

3. The compound having the formula

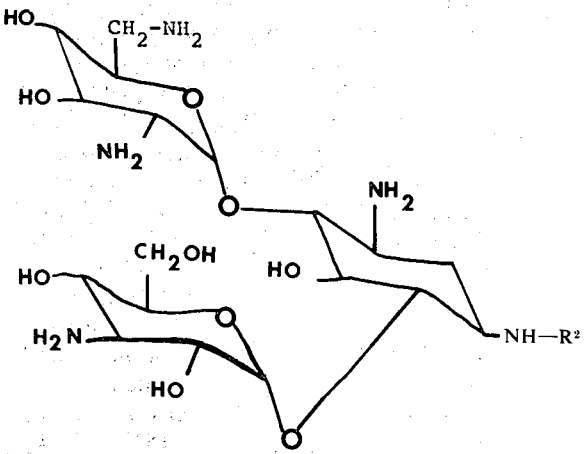

in which $R^2$ is L-(−)-β-amino-α-hydroxypropionyl; or a nontoxic pharmaceutically acceptable salt thereof.

4. The monosulfate salt of the compound of claim 2.
5. The monosulfate salt of the compound of claim 3.
6. The disulfate salt of the compound of claim 2.
7. The disulfate salt of the compound of claim 3.

* * * * *